3,306,834
FLUORINE COMPOUND MANUFACTURE
William B. Fox, Jefferson Township, Morris County, James S. MacKenzie, Parsippany Troy Hills, and Richard K. Vitek, Florham Park, N.J., assignors to Allied Chemical Corporation, New York, N.Y., a corporation of New York
No Drawing. Filed Apr. 26, 1963, Ser. No. 276,107
6 Claims. (Cl. 204—157.1)

This invention relates to processes for making trifluoroamine oxide, $F_3NO$, normally a colorless gas having boiling point of about minus 89° C. and melting point of about minus 161° C. $F_3NO$, a known compound, provides a missile ingredient, a powerful high energy oxidizer for missile fuels and an intermediate for the preparation of other high energy propellant oxidizers. Trifluoroamine oxide is further useful to lower substantially the freezing point of the known $N_2O_4$ oxidizer and correspondingly increases the utility range of $N_2O_4$.

Objectives of the invention are to provide processes for making $F_3NO$ by gas phase procedures which facilitate use of readily available compounds as starting materials.

In accordance with the invention, it has been found that gaseous nitrosyl fluoride and gaseous elemental fluorine may be reacted under certain ultraviolet light irradiation conditions to produce trifluoroamine oxide in recoverable form and in good yields. The invention includes discovery of the reactability of nitrosyl fluoride and elemental fluorine to form $F_3NO$, and the effectiveness of ultraviolet light irradiation to cause reaction of nitrosyl fluoride and elemental fluorine to synthesize trifluoroamine oxide.

In the broader aspects, practice of the invention process comprises introducing gaseous NOF and gaseous elemental fluorine into a reaction zone, and subjecting the material in such zone to ultraviolet light irradiation sufficient to effect reaction of NOF with fluorine to form trifluoroamine oxide. Reaction appears to proceed along the lines of

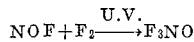

$$NOF + F_2 \xrightarrow{U.V.} F_3NO$$

Both raw materials are readily available. The elemental fluorine employed should be substantially free of HF, since the latter appears to markedly inhibit reaction. Nitrosyl fluoride, NOF, is a known commercially available compound, normally a colorless gas, and having a boiling point of about minus 56° C. and melting point of about minus 134° C. Commercial NOF and fluorine may be employed. NOF utilized should be substantially free of $N_2O$ and $NO_2$. The NOF-fluorine mixture charged to the reaction zone may be made by reaction, at substantially room temperature or a little above, of fluorine and nitric oxide (NO) in proportions of substantially 1.5 mols of fluorine per mol of nitric oxide.

Suitable apparatus in which reaction may be carried out may comprise an elongated tube closed at both ends and made of Monel or nickel or other material, such as stainless steel and Teflon, which is substantially inert with respect to starting materials and product. The reactor may be provided with one or more transparent windows, made e.g. from barium fluoride or calcium fluoride, arranged to permit admission of ultraviolet light into the reactor interior. For example, one end of a tubular reactor may be closed off in gas-tight relation by a disc-like plate of barium fluoride. The side of the reactor tube may be provided near one end with a valve controlled inlet for introduction of gas into the reactor, and near the other end with a valve controlled outlet for discharge of gas from the reactor. In practice, a gaseous mixture of NOF and elemental fluorine is charged into the reactor thru the gas inlet in such manner as to completely flush the reaction zone and fill the same with incoming gas mixture. On completion of flushing, the inlet and outlet valves are closed, and the charge in the reactor consists of the NOF-fluorine gas mixture at pressure of about 760 mm. of Hg, plus possibly incidental impurities.

In accordance with the invention, it has been found that in order to effect formation of $F_3NO$, the mixture of NOF and elemental fluorine starting materials should be subjected to ultraviolet light irradiation. Irradiation is ordinarily in the range of 2000–5000 Angstrom units, preferably 2000–4000 units. Ultraviolet light irradiation techniques in general are well known. Ultraviolet light may be supplied from any suitable source, for example by high pressure mercury lamps of wattage substantially in the range of 100 to 1000. Spacing of the light source from the reactor, and concentration of light rays on the window of the reactor, as by suitable reflectors, is within the skill of the art.

The reactor may be associated with equipment suitable to cool or warm the same. In usual arrangement of reactor and light source, sensible heat from the light source and some relatively mild external cooling of the reactor ordinarily serve to maintain satisfactory temperatures in the reaction zone. Reaction temperatures should not be higher than about 75° C. Temperatures below about 15° C. afford no advantage and are not preferred. Reactions proceed more satisfactorily when reaction temperatures are maintained substantially in the range of 25–50° C.

With regard to molar proportions of fluorine to NOF, theoretical considerations denote molar proportions of about 1:1. However, while any reactable proportions of fluorine and NOF may be employed, investigations show desirability of use of fluorine and NOF in proportions of not less than about 0.5 mol of fluorine per mol of NOF, usually substantially 0.5–2.5 mols of fluorine per mol of NOF, and in the better embodiments it is preferred to charge to the reaction zone fluorine and NOF in proportions of substantially 0.5–1.2 mols of fluorine per mol of NOF.

Significant yield of product has been obtained with radiation time as little as about 25 minutes. However, more satisfactory yields may be obtained with irradiation time of 2–6 hours. Rate of $F_3NO$ formation appears to slow down at greater irradiation time, and hence long irradiation time may be uneconomical. Extent of reaction may be determined by periodically running infrared spectrum on a sample of the reactor contents and comparing the intensity of spectral peaks of $F_3NO$ with standardized intensity charts for $F_3NO$.

On completion of reaction the material in the reaction zone comprises the sought-for $F_3NO$, some unreacted NOF and fluorine, and possibly a small amount of nitryl fluoride, $NO_2F$, B.P. minus 72° C. To effect recovery of trifluoroamine oxide product, the valved outlet of the reactor may be connected thru two cold traps connected in series to a source of high vacuum e.g. 0.1 to 5 mm. of Hg. The cold trap adjacent the reactor outlet may be refrigerated, as by a slush of melting isopentane, to a temperature e.g. minus 160° C. low enough to condense out NOF and any $NO_2F$, and the second trap may be refrigerated by liquid nitrogen down to about minus 196° C. to condense out $F_3NO$, B.P. minus 89° C. at atmospheric pressure. On low pressure evacuation of the reaction zone, the NOF and any $NO_2F$ of the gas exiting the reactor may be condensed out and separated from the gas stream in the first trap, and sought-for $F_3NO$ condensed out in the second trap from which may be vented any unreacted fluorine. Trifluoroamine oxide may be recovered from the second cold trap, and purified if desired by redistillation.

The following examples illustrate embodiments of the invention.

*Example 1.*—The reactor employed comprised a nickel cylinder, 4.3 cm. I.D. and 10 cm. long, closed at each end with a 5.0 cm. diameter barium fluoride window. The side of the cylinder was fitted with an inlet and an outlet, each valve controlled, for introduction into and discharge of gas from the reactor. Source of ultraviolet light was a Hanovia 550 watt, four inch, high pressure mercury lamp equipped with a parabolic aluminum reflector. The long axis of the lamp tube was in the same plane as and was disposed at a right angle to the longitudinal axis of the reactor, the tube axis being spaced about 6-8 inches from the window in one end of the reactor. The reflector was arranged to focus substantially all of the light on the adjacent reactor window which was spaced about one inch from the light discharge opening at the end of the reflector. A reaction mixture consisting of NOF and fluorine in mol ratio approximately 1:1 and containing a small amount of $F_3NO$ was prepared by reacting fluorine and nitric oxide, NO, (approximately 1.5:1 mol ratio) at about room temperature. This substantially 1:1 mol proportion reaction mixture of NOF and fluorine was charged into the reactor thru the valved inlet, the reactor was completely purged until an NOF-fluorine mixture exited the discharge outlet, and the inlet and outlet valves were closed, leaving the reactor fully charged with NOF-fluorine reaction mixture at pressure of about 760 mm. Infrared analysis of the NOF-fluorine mixture fed to the reactor showed the mixture contained $F_3NO$ in amount equivalent to about 10 mm. of Hg pressure. The NOF-fluorine mixture in the reactor was then subjected to irradiation with ultraviolet light, of wave length substantially in the range of 2000–4000 Angstrom units, from the reflector thru the adjacent barium fluoride window for about 2.5 hrs. During irradiation, the reactor was cooled by an air blower arranged to cool the reactor sufficiently to prevent any cracking of the barium fluoride window. Reaction temperature in the reactor in the course of the run was approximately in the range of 25 to 50° C. On completion of the run, infrared analysis of the reactor contents showed that the $F_3NO$ concentration had increased to at least 50 mm. of Hg pressure, corresponding to about a 10% yield (based on theory) of $F_3NO$.

*Example 2.*—Apparatus was the same as in Example 1 except that the reactor was about 9 cm. long. The NOF-fluorine mixture charged to the reactor was made as in Example 1, and contained NOF and fluorine in mol proportions of about 1:1, and infrared analysis showed that the mixture contained less than 5 mm. Hg pressure of $F_3NO$. The material in the reactor was irradiated with ultraviolet light as in Example 1 for a total period of about 5 hours. Reaction temperature throughout the run was in the approximate range of 25 to 50° C. At about one hour intervals during the run, the contents of the reactor were subjected to infrared analysis which showed regular and substantial increases in the concentration of $F_3NO$ present. At the end of the run, infrared analysis showed $F_3NO$ to be present in amount equivalent to approximately 200 mm. of Hg pressure, i.e. approximately a 52% yield of $F_3NO$.

*Example 3.*—The apparatus employed was substantially the same as in Example 1. At the outset of the run, the reactor was fully flushed and filled with fluorine, evacuated to pressure of about 400 mm. of Hg and then filled to atmospheric pressure with commercial NOF. In this instance, after charging, the reactor contained NOF and fluorine in mol proportions of about 0.9:1.0. Neither of the NOF nor fluorine reactants introduced into the reactor contained any detectable amount of $F_3NO$. The mixture in the reactor was subjected to irradiation with ultraviolet light for about 25 minutes. Reaction temperature was in the approximate range of 25 to 50° C. At the end of the run, infrared analysis of the contents of the reactor showed the presence of $F_3NO$ in amount equivalent to about 25 mm. of Hg pressure, corresponding to about 8% $F_3NO$ yield.

The compound trifluoroamine oxide, $F_3NO$ of the structure

is described and claimed in copending application Serial No. 179,521 of Fox, MacKenzie and Vanderkooi, Jr., filed March 9, 1962.

We claim:
1. The process for making trifluoroamine oxide which comprises introducing gaseous NOF and gaseous elemental fluorine into a reaction zone, subjecting the material in said zone to ultraviolet light irradiation sufficient to effect reaction of NOF with fluorine to form trifluoroamine oxide.

2. The process for making trifluoroamine oxide which comprises introducing gaseous NOF and gaseous elemental fluorine into a reaction zone, subjecting the material in said zone, at temperature not higher than about 75° C. to ultraviolet light irradiation sufficient to effect reaction of NOF with fluorine to form trifluoroamine oxide.

3. The process of claim 2 in which fluorine and NOF are charged in proportions of substantially not less than 0.5 mol of fluorine per mol of NOF.

4. The process for making trifluoroamine oxide which comprises introducing gaseous NOF and gaseous elemental fluorine into a reaction zone, subjecting the material in said zone, at temperature substantially in the range of 15–75° C. to ultraviolet light irradiation sufficient to effect reaction of NOF with fluorine to form trifluoroamine oxide.

5. The process of claim 4 in which fluorine and NOF are charged in proportions of substantially 0.5–2.5 mols of fluorine per mol of NOF.

6. The process for making trifluoroamine oxide which comprises introducing gaseous NOF and substantially 0.5–1.2 mols proportions of gaseous elemental fluorine into a reaction zone, subjecting the material in said zone, at temperature substantially in the range of 25–50° C., to ultraviolet light irradiation of wave length substantially in the range of 2000–4000 Angstrom units to effect reaction of NOF with fluorine to form trifluoroamine oxide.

References Cited by the Examiner
UNITED STATES PATENTS 3,032,400  5/1962  Marsh _____ 23—203
3,043,662  6/1962  Lipscomb _____ 23—203

JOHN H. MACK, *Primary Examiner.*

CARL D. QUARFORTH, *Examiner.*

J. D. VOIGHT, H. S. WILLIAMS, *Assistant Examiners.*